Aug. 31, 1948.　　　　　K. W. COUSE　　　　　2,448,172
AIRCRAFT SERVICE POWER TRUCK
Filed May 11, 1946　　　　　　　　　　　　　3 Sheets-Sheet 1
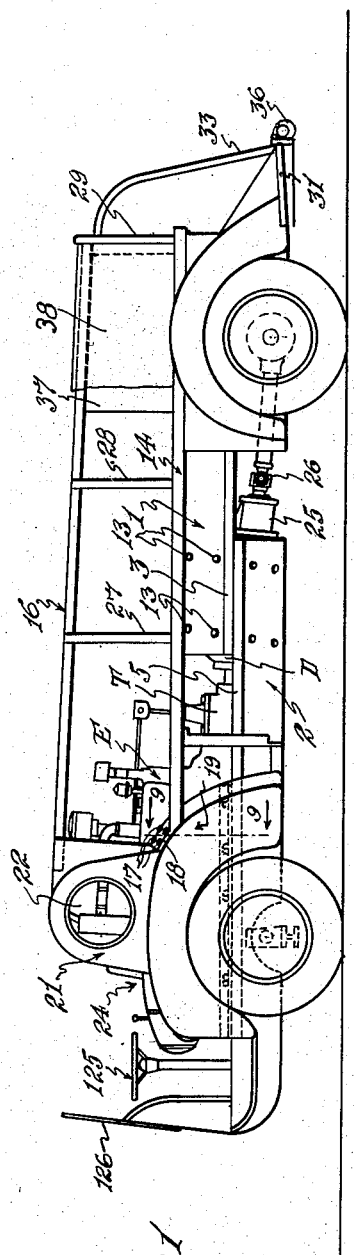
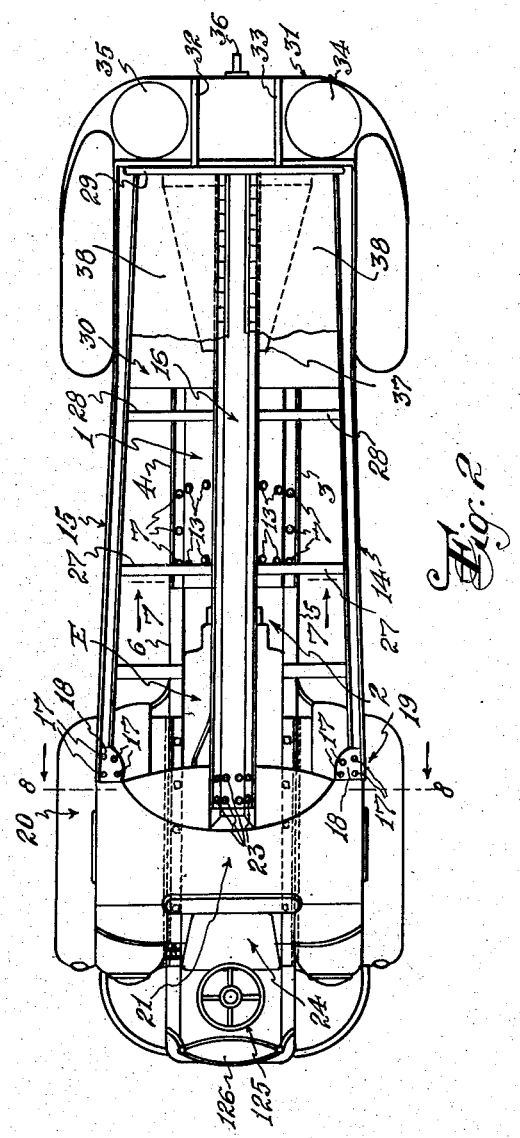
Inventor:
Kilbey W. Couse
BY
Attorney.

Aug. 31, 1948.          K. W. COUSE          2,448,172
            AIRCRAFT SERVICE POWER TRUCK
Filed May 11, 1946                          3 Sheets-Sheet 2
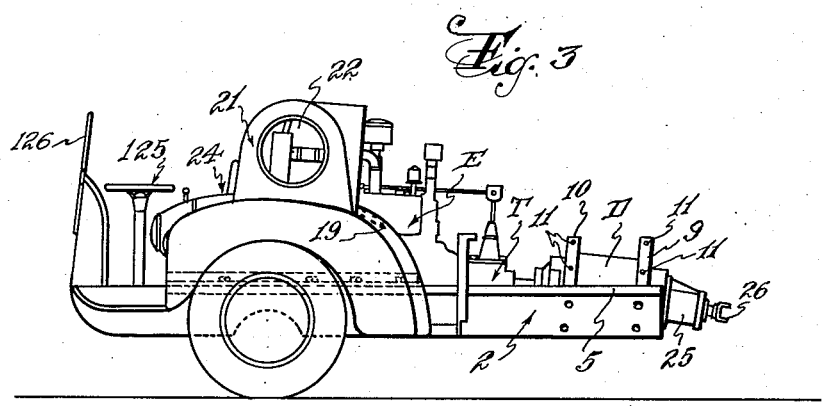
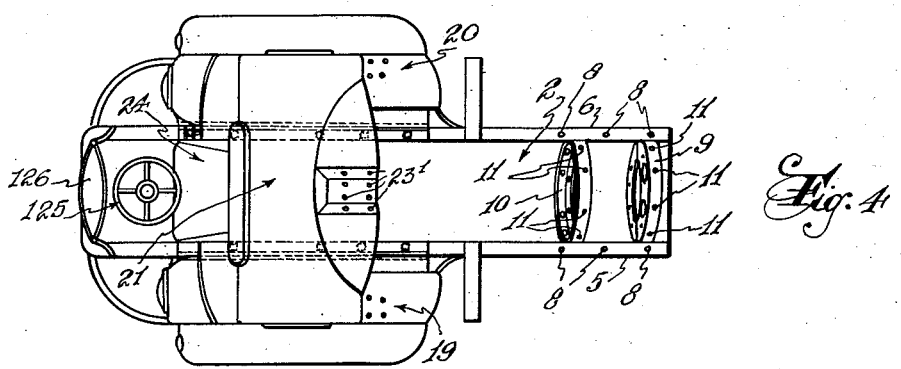
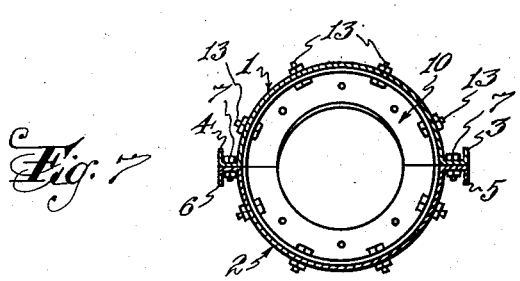
Inventor:
Kibbey W. Couse
BY Aug. 31, 1948.　　　　K. W. COUSE　　　　2,448,172
AIRCRAFT SERVICE POWER TRUCK
Filed May 11, 1946　　　　　　　　　　　　3 Sheets-Sheet 3
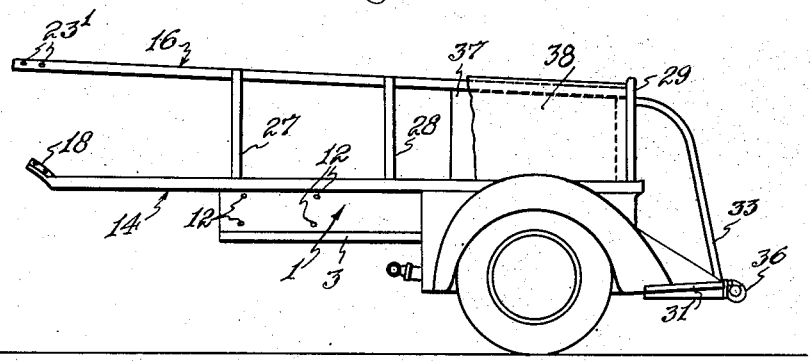
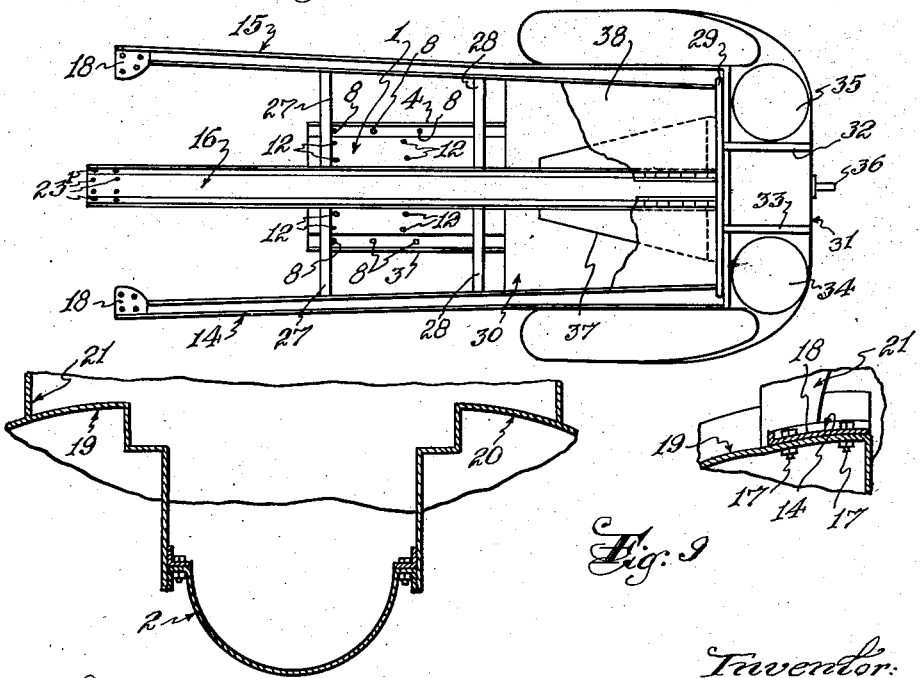
Inventor:
Kibbey W. Couse
BY
Attorney.

Patented Aug. 31, 1948

2,448,172

UNITED STATES PATENT OFFICE 2,448,172

AIRCRAFT SERVICE POWER TRUCK

Kibbey W. Couse, Newark, N. J.

Application May 11, 1946, Serial No. 669,113

8 Claims. (Cl. 280—106)

This invention relates to a power truck that is especially adapted for rendering special service to aircraft, particularly at air fields, although not limited to such places. The present day planes such as are used in transportation lines require considerable electrical power when the plane is grounded. This power is usually supplied from a storage battery and since there are limitations to the size of a battery which is carried on the plane while in flight, an additional battery has to be supplied when the plane is on the ground. To augment the normal supply of battery on the plane the past practice has been to use a battery carrier generally referred to in the trade as a "baby carriage" which is wheeled along under the plane and connected to its interior supply lines. But with the large planes, the present day battery carrier is insufficient to supply the demands.

Other services also are required on the present day planes such as the supplying of defrosting alcohol, hydraulic oil, air, oxygen or other gases under high pressure.

To meet these conditions, I have designed a special service truck of the general type shown and described in my pending application, S. N. 646,145, filed February 7, 1946. My present invention is directed to improvements in the construction of this particular type of service truck and has for its principal object a construction in which the truck itself can be serviced in a quick and expeditious manner.

This principal object is accomplished by making the chassis and the body or cover of the truck in two separable sections whereby the various and essential parts shall be easily accessible for inspection, repair or replacement purposes.

My improvements may be readily understood and appreciated by reference to the annexed drawings, wherein, Figure 1 is a side elevation of the service truck with certain of the cover parts removed.

Figure 2 is a plan view of Figure 1.

Figure 3 is a side view of the left hand or engine end of the structure shown in Figure 1.

Figure 4 is a plan view of Figure 3.

Figure 5 is a side view of the right hand or rear end of the structure shown in Figure 1.

Figure 6 is a plan view of Figure 5.

Figure 7 is a view on the line 7—7 of Figure 2 taken below the central hood supporting member.

Figure 8 is a view on the line 8—8 of Figure 2.

Figure 9 is a view on the line 9—9 of Figure 1.

In the drawings wherein like numbers refer to corresponding parts, the truck chassis is made up of a centrally disposed beam made up of two tubular sections, 1 and 2, each being substantially one-half of a cylinder. The cylindrical part 1 is operatively attached to the rear axle while the part 2 is operatively attached to the front axle. These two parts extend toward each other with their ends overlapping as shown in Figure 1, all as described in the application previously referred to. The part 1 has upturned flanges 3 and 4 on its opposite sides while part 2 has corresponding flanges 5 and 6. These flanges are fastened together by a plurality of bolts 7 which pass through holes 8. Support rings 9 and 10 are fastened to the cylindrical member 2. The rings 9 and 10 have holes therein to line up with the holes 12 in the cylindrical member 1 to receive holding bolts 13. By removing the holding bolts 7 and 13 the beam members 1 and 2 may be readily pulled apart but before they can be separated, certain cover or hood supporting members 14, 15 and 16 must be released. The members 14, 15 and 16 are preferably in the form of channel irons having their rear ends fastened to the rear section of the chassis while the forward ends of 14 and 15 are fastened by bolts 17 going through the flange plates 18. The flange plates 18 are bolted to the front fenders 19 and 20 to which is fastened as by welding an arcuately shaped hood 21 which passes over just the front portion of the engine and the radiator from one fender 19 to the other fender 20. While as stated the flanges 18 are bolted to the fenders 19 and 20 closely adjacent the hood 21, they may be fastened to the hood itself should this extend a sufficient amount in the direction of the front axle over the fenders. It will be noted from Figure 1 that the hood 21 is provided with ventilating holes 22 that is preferably covered with a suitable wire netting or equivalent.

The member 16 is centrally located between the members 14 and 15 but a substantial distance above them and is bolted to a part of the hood through the medium of bolts 23 passing through bolt holes 23'. A driver's seat 24, and steering wheel 125 and wind shield 126 are provided on the front end of the chassis forwardly of the hood 21. The forward unit carries the engine E and transmission T and a generator or dynamotor D, the latter being positioned within the rings 9 and 10. The dynamotor D has a hollow shaft through which the drive shaft from the transmission T extends to a power take-off mechanism 25 which is connected to a universal joint 26 that in turn is connected to the differential axle of the rear section of the truck.

The side members 14 and 15 are connected by arcuately curved braces 27 and 28 which act as supports for hoods or covers 38 pivoted to the upper centrally positioned member 16. While the hoods are pivoted to the member 16, the arrangement is such that they may be entirely removed if desired. A rear end arcuately shaped brace 29 is preferably welded to a table 30 as well as to the members 14, 15 and 16, the table being suitably fastened to the beam section 1. It may be mentioned in passing that the table 30 is for the purpose of mounting an electrical control panel 37 thereon for controlling all of the electrical equipment on the truck which is adapted to be supplied with many other pieces of equipment which form no part of my present invention.

The rear section of the truck has a platform 31 welded to the chassis and to the platform 31 is welded a pair of curved arms 32 and 33 the upper ends of which are fastened as by welding to the member 29. The platform 31 has recesses 34 and 35 therein to provide seats for supports that carry rear end search lights.

It may also be mentioned that the beam section 1 has a projecting arm with means 36 at its outer extremity for attaching a pull cable thereto so the truck can be used to tow an airplane.

From what has been said it will be seen that I have provided a service truck made up of front and rear sections which may be disconnected without too much trouble to allow full access to the operating parts of the truck. Having thus described my invention,

What I claim is:

1. A service truck having a chassis comprising a centrally located beam composed of two parts having overlapping ends and joining the front and rear axles having the usual wheels, wheel fenders and carrying an engine and having means for detachably fastening together said overlapping ends, and a top structure positioned above said beam, the top structure including an arcuately shaped hood extending between and joined to the front wheel fenders, a pair of members positioned one on each side of the truck in a plane above said beam and extending forwardly from the rear of the chassis to which they are fastened and being detachably fastened to said joined parts, and a member located between said pair of members but a substantial distance above them and fixed at one end to a support at the rear of the chassis and detachably fastened to said hood at the forward end of the chassis said three members acting to support hoods.

2. A service truck having front and rear detachable chassis sections, each section having a centrally located beam operatively attached respectively to the front and rear axles and extending toward each other and into overlapping relationship with means for detachably fastening the beam ends together, the rear section having a pair of fixed spaced side members positioned in a plane a substantial distance above said beam and extending to and adapted to be detachably fastened at one end to parts of said front section, a further member fastened to the rear section and positioned between and above said side members and extending to and adapted to be detachably fastened to a top part of said front section, said side and centrally located members forming supports for hoods.

3. A service truck having front and rear chassis sections that are detachable, each section having at least one rigid frame member operatively attached to its axle, the frame member parts extending toward each other with means for detachably fastening them together, the rear section having a pair of fixed spaced side members positioned in a plane a substantial distance above said frame parts and extending to and adapted to be detachably fastened at one end to parts of said front section, a further member fastened to the rear section and positioned between and above said side members and extending to and adapted to be detachably fastened to a top part of said front section, said side and centrally located members forming supports for hoods.

4. A service truck having front and rear axle sections, the sections being held together by a divided beam and cover supporting members, one part of the beam being operatively attached to the front axle while the other part of the beam is operatively attached to the rear axle, the parts of the beam extending from their axles into overlapping relationship and having means for detachably fastening these overlapping parts together, the cover supporting members being anchored to parts of the rear section and extending longitudinally in arcuately spaced relation to the front section and detachably fastened to parts thereof.

5. A service truck as defined in claim 4 further characterized in that part of said means for detachably fastening said overlapping parts together comprises a pair of longitudinally spaced rings normally positioned in the front section, the rings also serving as a cradle-like support for an electrical dynamotor or the like.

6. A service truck as defined in claim 4 further characterized in that the beam of the rear section carries a table that supports a control panel for controlling all of the electrical equipment on the truck.

7. A service truck as defined in claim 4 further characterized in that the beam of the rear section has an arm extension for attaching a tow line thereto.

8. A service truck as defined in claim 4 further characterized in that the rear section has an end platform with seats therein for light supports.

KIBBEY W. COUSE.

REFERENCES CITED

The following references are of record in the file of this patent:

UNITED STATES PATENTS

| Number | Name | Date |
| --- | --- | --- |
| 14,831 | Rosencrantz | May 6, 1856 |
| 399,389 | Dunn et al. | Mar. 12, 1889 |
| 914,722 | Holland et al. | Mar. 9, 1909 |

FOREIGN PATENTS

| Number | Country | Date |
| --- | --- | --- |
| 223,802 | Great Britain | Oct. 30, 1924 |